US010551242B2

(12) United States Patent
Miyake et al.

(10) Patent No.: US 10,551,242 B2
(45) Date of Patent: Feb. 4, 2020

(54) SIGNAL PROCESSING DEVICE, CONTROL METHOD OF SIGNAL PROCESSING DEVICE, CONTROL PROGRAM AND RECORDING MEDIUM

(71) Applicant: OMRON Corporation, Kyoto (JP)

(72) Inventors: Hiroki Miyake, Kyoto (JP); Toshiyuki Kojima, Kyoto (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 15/379,499

(22) Filed: Dec. 15, 2016

(65) Prior Publication Data

US 2017/0219419 A1    Aug. 3, 2017

(30) Foreign Application Priority Data

Jan. 29, 2016   (JP) ................................. 2016-016351

(51) Int. Cl.
*G01G 23/00* (2006.01)
*G01D 21/00* (2006.01)
*G01L 1/22* (2006.01)
*G08C 13/00* (2006.01)

(52) U.S. Cl.
CPC ............. *G01G 23/00* (2013.01); *G01D 21/00* (2013.01); *G01L 1/2262* (2013.01); *G08C 13/00* (2013.01)

(58) Field of Classification Search
CPC ................................ G01G 23/00; G01D 21/00
USPC ......................................................... 702/173
See application file for complete search history.

(56) References Cited

U.S. PATENT DOCUMENTS

| 5,172,783 A | 12/1992 | Feinland et al. |
| 9,784,601 B2* | 10/2017 | Willis ................... G01D 21/00 |
| 2005/0261821 A1* | 11/2005 | Abe ....................... F02D 35/027 |
| | | 701/111 |
| 2007/0046786 A1* | 3/2007 | Tokuyama ............. H04N 5/357 |
| | | 348/222.1 |
| 2007/0271056 A1* | 11/2007 | Nussbaumer ........ G01G 3/1414 |
| | | 702/104 |

(Continued)

FOREIGN PATENT DOCUMENTS

| CN | 1884982 | 12/2006 |
| CN | 101078646 | 11/2007 |
| CN | 101554894 | 10/2009 |

(Continued)

OTHER PUBLICATIONS

"Search Report of Europe Counterpart Application", dated May 22, 2017, p. 1-p. 9.

(Continued)

*Primary Examiner* — Ricky Ngon
(74) *Attorney, Agent, or Firm* — JCIPRNET

(57) ABSTRACT

The present invention reduces the time required by measuring a sensor object more than before. An input unit (10) includes an acquisition portion (11) that acquires a time sequence signal, a filter portion (12) that filters the time sequence signal according to a frequency, a forwarding portion (13) that forwards a filtered signal by frequency to a control device (90) and a filter switching portion (14). The filter switching portion (14) switches whether the filter portion (12) filters the time sequence signal according to a frequency in the process of acquiring the time sequence signal by the acquisition portion (11).

8 Claims, 4 Drawing Sheets

(56) References Cited

U.S. PATENT DOCUMENTS

2014/0023087 A1    1/2014  Czompo
2014/0324389 A1*  10/2014  Baldwin ................ G01D 9/005
                                                      702/187

FOREIGN PATENT DOCUMENTS

| CN | 102599901  | 7/2012  |
|----|------------|---------|
| CN | 103038616  | 4/2013  |
| CN | 104602599  | 5/2015  |
| JP | S63132120  | 6/1988  |
| JP | H06167383  | 6/1994  |
| JP | H0926352   | 1/1997  |
| JP | H10327499  | 12/1998 |
| JP | 2003207387 | 7/2003  |
| JP | 2003329508 | 11/2003 |
| JP | 2007003524 | 1/2007  |
| JP | 2013106136 | 5/2013  |
| JP | 2014119346 | 6/2014  |
| JP | 2014-153234| 8/2014  |

OTHER PUBLICATIONS

"Office Action of Japan Counterpart Application," with machine English translation thereof, dated Jun. 12, 2018, p. 1-p. 9.
"Office Action of China Counterpart Application," with English translation thereof, dated Nov. 29, 2018, pp. 1-16.
Office Action of China Counterpart Application, with English translation thereof, dated Apr. 26, 2019, pp. 1-12.
"Office Action of China Counterpart Application," with English translation thereof, dated Oct. 21, 2019, pp. 1-16.

\* cited by examiner

SIGNAL PROCESSING DEVICE, CONTROL METHOD OF SIGNAL PROCESSING DEVICE, CONTROL PROGRAM AND RECORDING MEDIUM

CROSS REFERENCE TO RELATED APPLICATIONS

This application claims the priority benefit of Japanese Patent Application No. 2016-016351, filed on Jan. 29, 2016. The entirety of the above-mentioned patent application is hereby incorporated by reference herein and made a part of this specification.

BACKGROUND OF THE INVENTION

1. Field of the Invention

The present invention relates to a signal processing device that filters a signal from a sensor and forwards the signal to a control device.

2. Description of Related Art

In recent years, a system (e.g., a Measuring system and a control system) has been developed to measure specified physical quantity (e.g., weight) of an object based on a signal output from a sensor such as a load cell and to utilize the measurement result. Accordingly, noise having bad influences on the measurement result is required to decrease.

A metering device is disclosed in Patent Document 1, of which one objective is to measure the weight of a carried object carried via a belt conveyor and to determine an abnormal state. In the metering device of Patent Document 1, a filter (frequency filter) is provided so as to remove noise included in a signal from a sensor.

PRIOR ART DOCUMENT

Patent Document

Patent Document 1: Japanese Patent Gazette No. 2014-153234 (published on Aug. 25, 2014)

SUMMARY OF THE INVENTION

Problem to be Solved

However, in the metering device of Patent Document 1, whether the action of switching a frequency filter in a measurement process has this technical through is not specifically considered. Thus, in the measurement process, the frequency filter acts all the time, and thus there is a possibility that the measurement time becomes long due to response time of the frequency filter.

The present invention is accomplished in view of the problem, of which an objective is to achieve a signal processing device, which can reduce the time required by measuring a sensor object more than before.

Means of Solving the Problem

To solve the problem, a signal processing device according to one aspect of the present invention filters a signal from a sensor and forwards the signal to a control device, the signal processing device includes: a data acquisition portion that acquires the signal of a time sequence, i.e., a time sequence signal, by periodically acquiring the signal from the sensor; a frequency filter that filters the time sequence signal acquired by the data acquisition portion according to a frequency; a filter switching portion that switches whether the frequency filter filters the time sequence signal acquired by the data acquisition portion according to a frequency in the process of acquiring the time sequence signal by the data acquisition portion; and a forwarding portion that forwards the signal filtered by the frequency filter according to the frequency or the signal acquired by the data acquisition portion to the control device.

According to the composition, a frequency filter can be switched in the process of acquiring the time sequence signal by the data acquisition portion, i.e., in the process that the signal processing device acts. Thus, the frequency filter can act only in a period of desired signal stabilization, and the action of the frequency filter stops in other periods. Therefore, the time required by measuring a sensor object can be reduced more than before.

Moreover, in the signal processing device, preferably, the multiple frequency filters suppress passing bands without repeating, and the filter switching portion switches, corresponding to each frequency filter, whether the multiple frequency filters are adapted to the time sequence signal acquired by the data acquisition portion.

According to the composition, whether filtering is performed can be determined corresponding to each frequency filter. Thus, filtering can be performed only through suitable frequency filters.

For example, in the case that noise frequencies are different according to sensor objects, by making a frequency filter suitable for each sensor object different, suitable frequency filters are applicable.

In addition, the so-called frequency component to be removed, in the case of a low pass filter (LPF), refers to a frequency component of a high band not passing the filter, and in the case of a band elimination filter (BEF), refers to a frequency component of a removed object.

Moreover, according to the composition, a frequency filter can be switched in the process of acquiring the time sequence signal by the data acquisition portion, i.e., in the process that the signal processing device acts. Thus, even if the sensor object changes in the action process, it is also applicable to an appropriate frequency filter corresponding to the sensor object.

Moreover, in the signal processing device, preferably, the multiple frequency filters include a low pass filter and a notch filter.

According to the composition, the multiple frequency filters include a low pass filter and a notch filter. Thus, noise in low bands can be suppressed, and noise in required bands can be suppressed.

Moreover, in the signal processing device, preferably, the filter switching portion receives a control command from the control device, and switches the multiple frequency filters according to the control command.

According to the composition, switching of a frequency filter can be performed by sending a control command from the control device.

Moreover, in the signal processing device, preferably, the filter switching portion switches the multiple frequency filters according to a flag set corresponding to each frequency filter, and the flag is rewritten by the control device.

According to the composition, switching of a frequency filter can be performed by rewriting a flag by the control device.

Moreover, to solve the problem, a control method of a signal processing device according to one aspect of the present invention forwards a signal from a sensor to a control device, the control method of the signal processing device including: a data acquisition step of acquiring the signal of a time sequence, i.e., a time sequence signal, by periodically acquiring the signal from the sensor; a filtering step of frequency-filtering the time sequence signal acquired in the data acquisition step; and a forwarding step of forwarding the signal filtered in the filtering step or the signal acquired in the data acquisition step to the control device, and the control method of a signal processing device further including: a filter switching step of switching whether the time sequence signal acquired in the data acquisition step is filtered in the filtering step during the process of acquiring the time sequence signal in the data acquisition step.

According to the composition, similar to a signal processing device according to one aspect of the present invention, the time required by measuring a sensor object can be reduced more than before.

Moreover, the signal processing device may also be implemented through a computer. In this case, by making the computer act as various parts (software elements) of the signal processing device, a control program of a signal processing device that utilizes the computer to achieve the signal processing device and a recording medium recording the control program and computer-readable also belong to the category of the present invention.

Effect of the Invention

A signal processing device according to one aspect of the present invention produces the following effect, i.e., the time required by measuring a sensor object can be reduced more than before.

Moreover, a control method of a signal processing device according to one aspect of the present invention also produces the same effect.

DESCRIPTION OF THE EMBODIMENTS

Embodiment 1

Figure 1:
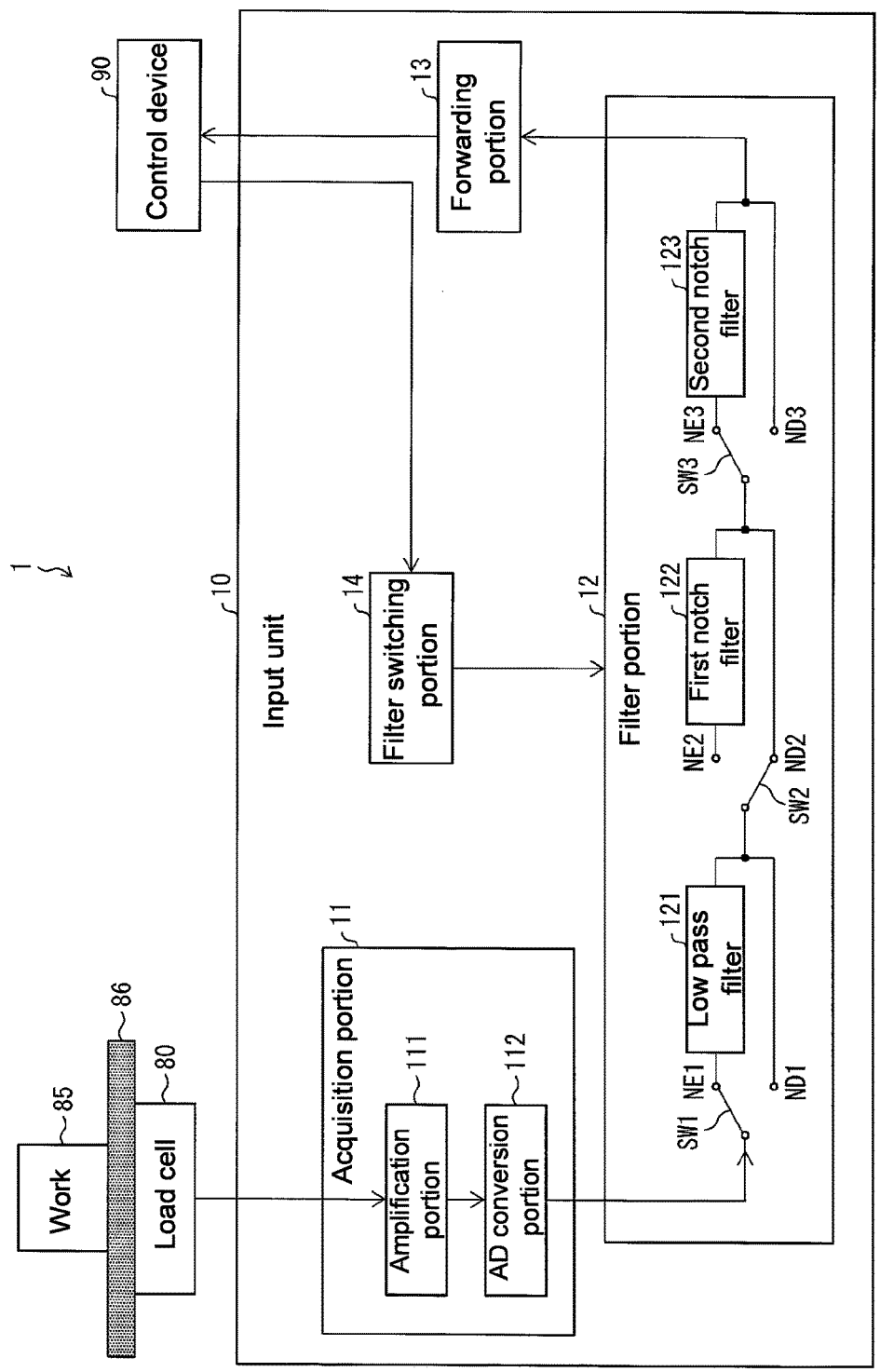
FIG. 1 is a functional block diagram of a general form of a measuring system according to Embodiment 1 of the present invention.

In the following, Embodiment 1 of the present invention is described based on FIG. 1 to FIG. 5. FIG. 1 is a functional block diagram of a general form of a measuring system 1 according to this embodiment. Firstly, the composition of the measuring system 1 is stated with reference to FIG. 1.

(Measuring System 1)

The measuring system 1 includes an input unit 10 (signal processing device), a load cell 80 (sensor) and a control device 90. Moreover, the input unit 10 includes an acquisition portion 11, a filter portion 12 (frequency filter), a forwarding portion 13 and a filter switching portion 14.

The load cell 80 is a sensor for measuring specified physical quantity of a measuring object (sensor object). The measuring object in this embodiment is a work 85 placed on a platform scale 86. In this embodiment, the load cell 80 is used for measuring the weight of the work 85.

Figure 2:
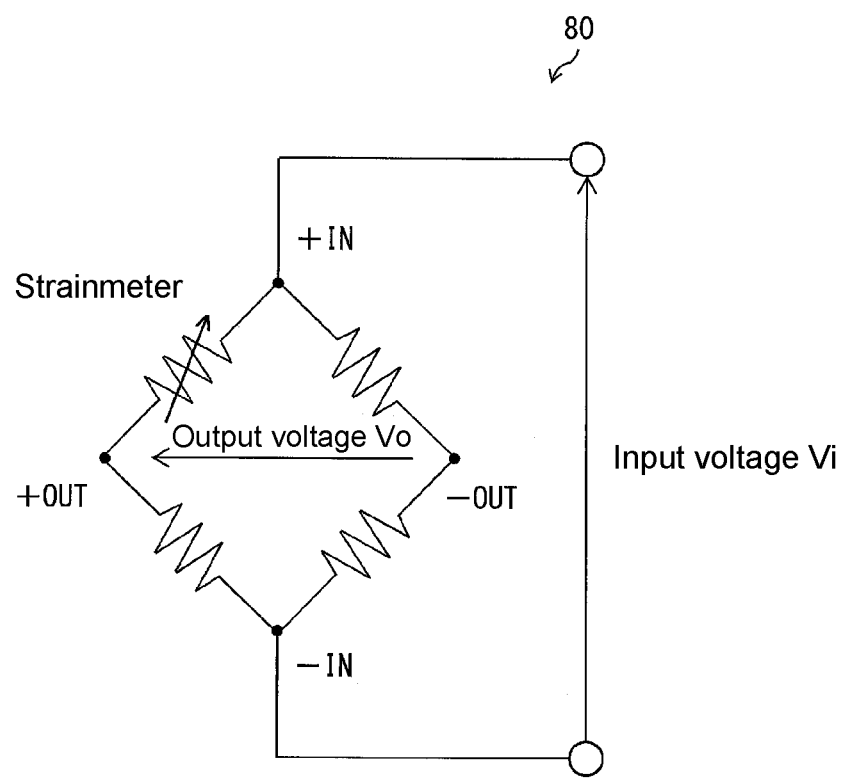
FIG. 2 is a circuit diagram for generally describing the measurement principle of a load cell.

FIG. 2 is a circuit diagram for generally describing the measurement principle of the load cell 80. As shown in FIG. 2, the load cell 80 includes a Wheatstone bridge circuit using a strainmeter. Generally, the resistance of the strainmeter may change according to a load (e.g., weight or pressure, more specifically strain) given to the strainmeter.

Therefore, when a load is given to the load cell 80, even if an input voltage Vi applied to the Wheatstone bridge circuit is fixed, an output voltage Vo may also change. The output voltage Vo is output from the load cell 80 to the input unit 10 in the form of a signal (an electrical signal or a metering signal) for measuring the weight of the work 85.

The input unit 10 implements various operations (amplification, AD conversion and filtering) on the metering signal acquired from the load cell 80, and gives the metering signal after operations (the filter signal described later) to the control device 90. That is, the input unit 10 functions as an interface for transmitting a signal from the load cell 80 to the control device 90. Moreover, the input unit 10 may also be understood as a signal processing device that processes (filters) a metering signal from the load cell 80 and forwards the signal to the control device 90.

In the input unit 10, the acquisition portion 11 periodically acquires a metering signal from the load cell 80. That is, the acquisition portion 11 acquires a time sequence metering signal. In addition, the time sequence metering signal is also referred to as a time sequence signal. Moreover, the acquisition portion 11 includes an amplification portion 111 and an AD conversion portion 112.

The amplification portion 111 amplifies the time sequence signal acquired from the load cell 80 as an analog signal. Moreover, the AD conversion portion 112 converts the time sequence signal amplified in the amplification portion 111 to a digital signal, and gives the digital signal to the filter portion 12. Through AD conversion in the AD conversion portion 112, various operations in the input unit 10 and the control device 90 become easy.

The filter portion 12 performs filtering corresponding to a frequency on the digital time sequence signal supplied from the AD conversion portion 112. Specifically, the filter portion 12 functions as a digital filter that suppresses specified band signals from passing. In addition, specific composition of the filter portion 12 will be described later. Moreover, the filter switching portion 14 will also be described later.

The forwarding portion 13 acquires a filter signal from the filter portion 12, and forwards the filter signal to the control device 90. Then, the control device 90 performs operations on the filter signal and converts it to specified physical quantity. For example, the control device 90 converts the filter signal to weight. The conversion result is also referred to as a measurement result (measuring value). In addition, the conversion may also be performed in the forwarding portion 13. In this case, the forwarding portion 13 forwards the conversion result to the control device 90.

As stated above, the measuring system 1 is a system formed for measuring the weight of the work 85 by using the load cell 80. In addition, the control device 90 may also control various external devices by using the measured weight of the work 85.

(Filter Portion 12)

The filter portion 12 includes three digital filters, i.e., a low pass filter 121 (frequency filter), a first notch filter 122 (notch filter, frequency filter) and a second notch filter 123 (notch filter, frequency filter). Moreover, the filter portion 12 includes switches SW1-SW3.

Frequency filters are stated at first. The low pass filter 121 is a filter that suppresses passing of high-band signals. That is, the low pass filter 121 is a filter that allows low-band signals to pass. In addition, the low pass filter (LPF) is also referred to as a low-band pass filter.

Moreover, the first notch filter 122 and the second notch filter 123 are filters that only suppress passing of signals in particular bands respectively. The first notch filter 122 and the second notch filter 123 may be understood as BEFs with narrow stop bands respectively.

In addition, the low pass filter 121, the first notch filter 122 and the second notch filter 123 are set to suppress passing bands without repeating. For example, in this embodiment, the first notch filter 122 is set to suppress passing of midband signals, and the second notch filter 123 is set to suppress passing of high-band signals.

In this embodiment, the digital metering signal is filtered by the low pass filter 121, the first notch filter 122 and the second notch filter 123. In the following, the filtered metering signal is referred to as a filter signal.

Then, the switches SW1-SW3 are stated. The switches SW1-SW3 function as switches for switching valid/invalid filtering in the frequency filters (the low pass filter 121, the first notch filter 122 and the second notch filter 123) respectively.

The switch SW1 is a switch that switches a connection state between an output end of the AD conversion portion 112 and an input end of the low pass filter 121. Herein, a situation where the switch SW1 is connected to one side of a node NE1 (a node as the input end of the low pass filter 121) is referred to as an ON state, and a situation where the switch SW1 is connected to one side of a node ND1 (a node different from the input end of the low pass filter 121) is referred to as an OFF state.

In the case that the switch SW1 is in the ON state, a signal (time sequence signal) output from the output end of the AD conversion portion 112 is input to the lower pass filter 121, and thus is filtered by the lower pass filter 121. On the other hand, in the case that the switch SW1 is in the OFF state, the signal output from the output end of the AD conversion portion 112 is not input to the lower pass filter 121, and thus is not filtered by the lower pass filter 121. In this way, the switch SW1 functions as a switch that switches valid/invalid filtering in the flow pass filter 121.

The switch SW2 is a switch that switches a connection state between an output end of the low pass filter 121 and an input end of the first notch filter 122. Herein, a situation where the switch SW2 is connected to one side of a node NE2 (a node as the input end of the first notch filter 122) is referred to as an ON state, and a situation where the switch SW2 is connected to one side of a node ND2 (a node different from the input end of the first notch filter 122) is referred to as an OFF state.

In the case that the switch SW2 is in the ON state, a signal output from the output end of the lower pass filter 121 is input to the first notch filter 122, and thus is filtered by the first notch filter 122. On the other hand, in the case that the switch SW2 is in the OFF state, the signal output from the output end of the lower pass filter 121 is not input to the first notch filter 122, and thus is not filtered by the first notch filter 122. In this way, the switch SW2 functions as a switch that switches valid/invalid filtering in the first notch filter 122.

The switch SW3 is a switch that switches a connection state between an output end of the first notch filter 122 and an input end of the second notch filter 123. Herein, a situation where the switch SW3 is connected to one side of a node NE3 (a node as the input end of the second notch filter 123) is referred to as an ON state, and a situation where the switch SW3 is connected to one side of a node ND3 (a node different from the input end of the second notch filter 123) is referred to as an OFF state.

In the case that the switch SW3 is in the ON state, a signal output from the output end of the first notch filter 122 is input to the second notch filter 123, and thus is filtered by the second notch filter 123. On the other hand, in the case that the switch SW3 is in the OFF state, the signal output from the output end of the first notch filter 122 is not input to the second notch filter 123, and thus is not filtered by the second notch filter 123. In this way, the switch SW3 functions as a switch that switches valid/invalid filtering in the second notch filter 123.

(Filter Switching Portion 14)

The filter switching portion 14 is a member that controls switching of ON/OFF of the switches SW1-SW3. In other words, the filter switching portion 14 functions as a member that controls switching of valid/invalid filtering in the frequency filters.

As an example, the filter switching portion 14 may receive a control command from the control device 90, and control switching of ON/OFF of the switches SW1-SW3 according to the control command. According to the composition, by sending a control command from the control device 90 to the filter switching portion 14, valid/invalid switching of the frequency filters can be performed.

Moreover, preferably, the filter switching portion 14 can control switching of ON/OFF of the switches SW1-SW3 (in other words, valid/invalid switching of the frequency filters) according to the control command in the process of acquiring the time sequence signal by the acquisition portion 11.

According to the composition, valid/invalid switching of the frequency filters can be performed in the process of acquiring the time sequence signal by the acquisition portion 11, i.e., in the process that the input unit 10 acts. Thus, as described later, even if the sensor object (work) changes in the measurement process, it is also applicable to an appropriate frequency filter corresponding to the sensor object.

Moreover, the filter switching portion 14 may also control switching of ON/OFF of the switches SW1-SW3 (in other words, valid/invalid switching of the frequency filters) through a flag (e.g., switching signals SIG1-SIG3 described later) set corresponding to each frequency filter. In addition, preferably, the flag is rewritten by the control device 90.

According to the composition, the flag is rewritten by the control device 90, so that valid/invalid switching of the frequency filters can be performed. In addition, the rewriting of the flag can be performed according to a user's operation on the control device 90, and can also be performed according to a program prepared by the user in advance.

(Objective of the Measuring System 1)

In the measuring system 1, bad influences of mechanical noise or electrical noise on the measuring value are considered. The mechanical noise, for example, is noise caused by (i) vibration of a mechanical system or (ii) a natural vibration frequency of an inertial system including a work 85 and a platform scale 86. Moreover, the electrical noise, for example, is (i) low-frequency noise at a frequency of 50 Hz or 60 Hz, or (ii) high-frequency noise at a frequency of 1 kHz to 10 kHz.

Therefore, in the measuring system 1, excluding the influences of the multiple noise on the measuring value is used as one objective, and multiple frequency filters are disposed in the filter portion 12.

As an example, a situation is considered that the frequency of the electrical low-frequency noise is 60 Hz, the vibration frequency of the mechanical system is 200 Hz, and the frequency of the electrical high-frequency noise is 1 kHz to 10 kHz.

In this case, the electrical high-frequency noise (high-band noise) at a frequency of 1 kHz to 10 kHz can be removed by the low pass filter 121. Moreover, the electrical low-frequency noise at a frequency of 60 Hz (low-band noise at a particular frequency (first particular frequency)) can be removed by the first notch filter 122. The mechanical noise at a frequency of 200 Hz (low-band noise at a particular frequency (second particular frequency)) can be removed by the second notch filter 123. Herein, there may be multiple noise bands in the case that the electrical noise and the mechanical noise overlap.

According to the measuring system 1, even if there are multiple noise bands (e.g., in the case that the electrical noise and the mechanical noise overlap), noise can be properly suppressed by multiple frequency filters (the low pass filter 121, the first notch filter 122 and the second notch filter 123) corresponding to the bands.

(First Effect of the Measuring System 1)

According to the measuring system 1, the measurement time can be reduced. The effect thereof is described below with reference to FIG. 3 and FIG. 4. Herein, switching signals set corresponding to the low pass filter 121, the first notch filter 122 and the second notch filter 123 are referred to as switching signals SIG1-SIG3 (flags) respectively.

The switching signals SIG1-SIG3 are control signals for setting the frequency filters as invalid. The switching signals SIG1-SIG3 in this embodiment are 1-bit digital signals. The switching signals SIG1-SIG3 may also be referred to as invalid bits.

Specifically, in the case that values (logic values) of SIG1-SIG3 are "1" (high), the low pass filter 121, the first notch filter 122 and the second notch filter 123 are invalid respectively. On the other hand, values of SIG1-SIG3 are "0" (low), the low pass filter 121, the first notch filter 122 and the second notch filter 123 are valid respectively.

Figure 3:
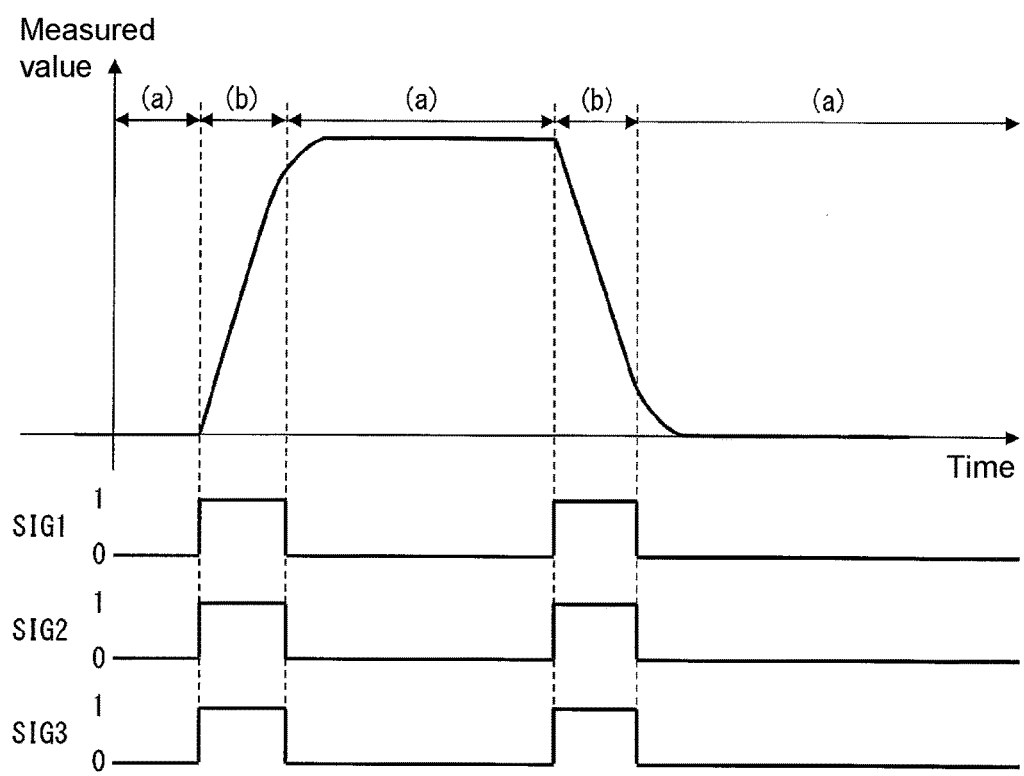
FIG. 3 is a diagram of an example between actions and measurement time of frequency filters in the measuring system according to Embodiment 1 of the present invention.
Figure 4:
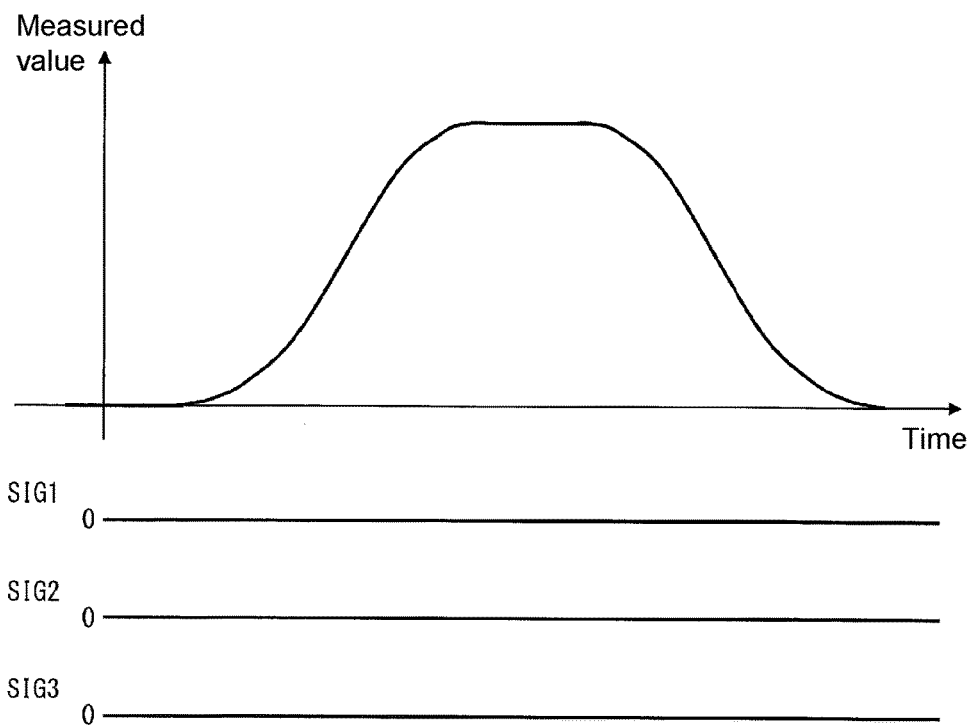
FIG. 4 is a comparison diagram of FIG. 3, and is a diagram of another example between actions and measurement time of frequency filters.

FIG. 4 is a diagram of an example of actions and measurement time of the frequency filters. In addition, FIG. 4 is a comparison diagram of FIG. 3 described later. Specifically, FIG. 4 illustrates a situation where the values of SIG1-SIG3 are always "0" and all the frequency filters are valid all the time.

In addition, as shown in FIG. 4, in the case that all the frequency filters are valid all the time, although the measured values are fully stable in a previous time range, the measurement time may sometimes become long relatively as the response time of each frequency filter becomes long.

Therefore, in this embodiment, by assigning a valid/invalid switching function of the frequency filter to the measuring system, the measurement time can also be reduced even if multiple frequency filters are provided.

FIG. 3 is a diagram of an example between actions and measurement time of frequency filters in the measuring system 1. In FIG. 3, the period (a) is a period in which values of SIG1-SIG3 are "0" and all the frequency filters are valid. As an example, the period (a) is a period in which stabilization of the measured value is especially desired. In the case of FIG. 3, the period (a) is a period in which the measured value is substantially fixed.

On the other hand, the period (b) is a period in which the values of SIG1-SIG3 are change to "1" and all the frequency filters are invalid. The period (b) is a period in which the period (a) is removed. In other words, the period (b) is a period in which the measured value may not be stabilized. In the case of FIG. 3, the period (b) is a rise period and a fall period of the measured value. In addition, as an example, rising of the measured value is generated when the work 85 is placed on the platform scale 86. Moreover, falling of the measured value is generated when the work 85 is dismounted from the platform scale 86.

In the period (b), actions of the frequency filters are set as invalid, and thus the measurement time is reduced compared with the situation where the actions of the frequency filters are set as valid. As an example, it can be understood with reference to FIG. 3 that the rising period and the falling period of the measured value are fully shorter than those in FIG. 4.

In this way, according to the measuring system 1, the frequency filters can be set as valid only in a period of especially desiring stabilization of the measured value, and thus the measurement time can also be reduced even if multiple frequency filters are provided.

(Second Effect of the Measuring System 1)

Then, according to the measuring system 1, a preferred frequency filter can also be switched for use according to the change of the measuring object. Then, the effect thereof is described with reference to FIG. 5.

Figure 5:
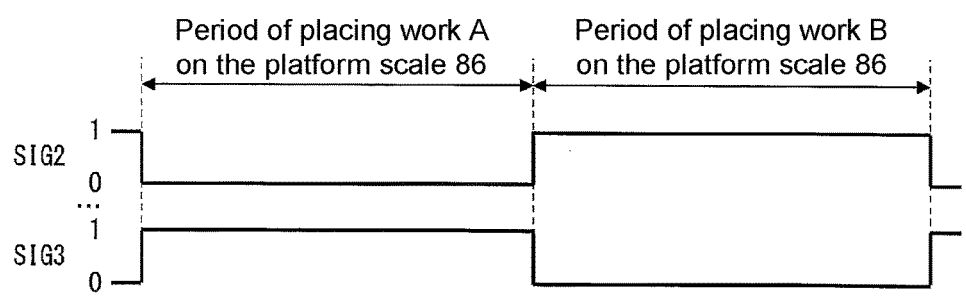
FIG. 5 is a diagram of another example of switching signals in the measuring system according to Embodiment 1 of the present invention.

FIG. 5 is a diagram of another example of switching signals in the measuring system 1. In addition, in FIG. 5, illustration of the switching signal SIG1 is omitted in order to describe switching of the actions of the first notch filter 122 and the second notch filter 123.

In the measuring system 1, the type of the work becoming a measuring object is not limited to one, and sometimes, multiple types of works become measuring objects respectively. As an example, a situation is considered that two works with different weight become measuring objects. In order to distinguish them, the two works are referred to as work A and work B in the following.

In this case, as work A and work B have different weight, an inertial system including work A and the platform scale 86 (inertial system A) and an inertial system including work B and the platform scale 86 (inertial system B) have different natural vibration frequencies. Thus, frequencies of different band noise may be generated in the case of placing work A on the platform scale 86 and in the case of placing work B on the platform scale 86.

Based on this, in the composition of FIG. 5, characteristics of the frequency filters are preset as (i) the first notch filter 122 reduces noise at a frequency near the natural vibration frequency of the inertial system A, and (ii) the second notch filter 123 reduces noise at a frequency near the natural vibration frequency of the inertial system B.

As shown in FIG. 5, in the period of placing work A on the platform scale 86, if SIG2=0 and SIG3=1, only the first notch filter 122 can be set as valid in the period. On the other hand, in the period of placing work B on the platform scale 86, if SIG2=1 and SIG3=0, only the second notch filter 123 can be set as valid in the period.

In this way, according to the measuring system 1, a preferred frequency filter can be switched according to the change of the work placed on the platform scale 86 and used. Thus, even if multiple works become measuring objects, the measured values can be stable. In addition to this, frequency filters unnecessary for reduction of noise can be set as invalid, and thus increase of the measuring time can be suppressed.

In addition, the composition of FIG. 5 is also beneficial in the case that there is one type of work. As an example, in the case that the weight of the work 85 is the same as that of the platform scale 86, the intention of making the natural vibration frequency of the platform scale 86 different from the natural vibration frequency of the inertial system including the work 85 and the platform scale 86 is considered. In this case, noise at different frequencies are intentionally generated near the time of placing the work 85 on the platform scale 86 and near the time of dismounting the work 85 from the platform scale 86 respectively.

In order to cope with variation of such noise frequencies, for example, it is feasible to only preset the characteristics of the frequency filters as follows: (i) the first notch filter 122 reduces noise at a frequency near the natural variation frequency of the platform scale 86, and (ii) the second notch filter 123 reduces noise at a frequency near the natural variation frequency of the inertial system including the work 85 and the platform scale 86. According to the composition, a preferred frequency filter is switched and used respectively when the work 85 can be placed on the platform scale 86 and when the work 85 can be dismounted from the platform scale 86.

Embodiment 2

In addition, in the measuring system 1, the number of frequency filters disposed on the filter portion 12 may also be one.

For example, in the case that the measuring system 1 is formed in a manner of fully suppressing electrical noise, mechanical noise is removed only by the filter portion 12. In this case, it is feasible to only dispose the second notch filter 123 in the filter portion 12, and the low pass filter 121 and the first notch filter 122 may also be omitted.

In the composition, validity/invalidity of the second notch filter 123 can also be switched through a filter switching portion 14, and thus the measurement time can be reduced.

[Varying Example]

(1) In addition, in a measuring system according to one aspect of the present invention, in the case of multiple frequency filters, the number of the frequency filters may not be limited to three. For example, the number of the frequency filters may also be two or four or more than four. That is, as long as the filter portion includes multiple (two or more than two) frequency filters that suppress passing bands without repeating.

According to the composition, filtering corresponding to a frequency can be performed by using one or more than one appropriate frequency filter in the multiple frequency filters that suppress passing bands without repeating, and thus band noise can be properly suppressed. Moreover, if multiple frequency filters are used, various combined band noise can be suppressed by changing the combination of the frequency filters.

(2) Also, in the measuring system according to one aspect of the present invention, the sensor is not merely limited to the load cell. For example, the sensor in the measuring system according to one aspect of the present invention may also be various sensors such as a temperature sensor, a photo sensor or a speed sensor.

[Embodiment by Means of Software]

Control blocks of the measuring system 1 (especially the input unit 10 and the control device 90) can be implemented by a logic circuit (hardware) formed on an integrated circuit (IC chip) or the like, and may also be implemented by software by using a Central Processing Unit (CPU).

In the latter situation, the measuring system 1 has a CPU that executes a command of software, i.e., program, which implements various functions, a Read Only Memory (ROM) or storage devices (which are referred to as "recording medium") recording the program and various data that can be read by a computer (or CPU), and a Random Access Memory (RAM) expanding the program, etc. Moreover, the objective of the present invention is achieved by reading and executing the program from the recording medium by the computer (or CPU). As the recording medium, "non-temporary tangible medium" can be used, for example, a tape, a disk, a card, a semiconductor memory, a programmable logic circuit and the like can be used. Moreover, the program may also be provided to the computer via any transmission medium (communication networks or broadcast waves, etc.) that can transmit the program. In addition, the present invention can also be implemented in the form of data signals instantiating the program and embedded into carriers through electronic transmission.

[Postscript]

The present invention is not limited to the various implementations, various changes can be made within the scope indicated in the claims, and implementations obtained by properly combining technical components disclosed in different implementations respectively are also included in the technical scope of the present invention.

What is claimed is:

1. A signal processing device, filtering a signal from a sensor and forwarding the signal to a control device, the signal processing device comprising:

a data acquisition portion, acquiring the signal of a time sequence as a time sequence signal, by periodically acquiring the signal from the sensor;

a frequency portion, filtering the time sequence signal acquired by the data acquisition portion according to frequency, wherein the frequency portion comprises a plurality of frequency filters connected in series;

a filter switching portion, selecting a part of the frequency filters according to the time sequence signal acquired by the data acquisition portion according to frequency in the process of acquiring the time sequence signal by the data acquisition portion, wherein an output of the selected frequency filter is connected to an output of a non-selected frequency filter and connected to an input of another selected frequency filter next to the selected frequency filter; and a forwarding portion, forwarding the signal filtered by the frequency portion according to frequency or the signal acquired by the data acquisition portion to the control device.

2. The signal processing device according to claim 1, comprising:

a plurality of frequency filters, the frequency filters suppressing passing bands without repeating, and the filter switching portion switching, corresponding to each of the frequency filters, whether or not the frequency filters are adapted to the time sequence signal acquired by the data acquisition portion.

3. The signal processing device according to claim 2, wherein
the frequency filters comprise a low pass filter and a notch filter.

4. The signal processing device according to claim 3, wherein
the filter switching portion receives a control command from the control device, and switches the frequency filters according to the control command.

5. The signal processing device according to claim 3, wherein
the filter switching portion switches the frequency filters according to a flag as setting corresponding to each of the frequency filters, and
the flag is rewritten by the control device.

6. A non-transitory computer readable medium including a control program, for causing a computer to function as the signal processing device according to claim 1, wherein the control program is used for causing the computer to function as the data acquisition portion, the frequency filter, the filter switching portion and the forwarding portion.

7. A control method of a signal processing device, forwarding a signal from a sensor to a control device, the control method of the signal processing device comprising:

a data acquisition step, acquiring the signal of a time sequence as a time sequence signal, by periodically acquiring the signal from the sensor;

a filtering step, filtering by frequency on the time sequence signal acquired in the data acquisition step, wherein the filtering step is performed by a plurality of frequency filters connected in series; and a forwarding step, forwarding the signal filtered in the filtering step or the signal acquired in the data acquisition step to the control device, and the control method of the signal processing device further comprising:

a filter switching step, selecting a part of the frequency filters according to the time sequence signal acquired in the data acquisition step as filtered in the filtering step during the process of acquiring the time sequence signal in the data acquisition step, wherein an output of the selected frequency filter is connected to an output of a non-selected frequency filter and connected to an input of another selected frequency filter next to the selected frequency filter.

8. A non-transitory computer readable medium containing computer instructions stored therein for causing a computer processor to perform steps of the control method according to claim 7.

* * * * *